No. 654,548. Patented July 24, 1900.
E. LATISNIÈRE.
PLANTER REGULATING ATTACHMENT.
(Application filed May 9, 1899.)

(No Model.)

Witnesses
Inventor:
Etienne Latisnière

UNITED STATES PATENT OFFICE.

ETIENNE LATISNIÈRE, OF GAYON, FRANCE.

PLANTER-REGULATING ATTACHMENT.

SPECIFICATION forming part of Letters Patent No. 654,548, dated July 24, 1900.

Application filed May 9, 1899. Serial No. 716,129. (No model.)

*To all whom it may concern:*

Be it known that I, ETIENNE LATISNIÈRE, a citizen of the Republic of France, residing at Gayon, Basses-Pyrénées, France, have invented certain new and useful Improvements in Planter-Regulating Attachments, of which the following is a specification.

My present invention relates to planters, the object being to provide a regulating attachment therefor adapted to be employed in sowing crosswise and in square. This mode of sowing is more particularly employed for Indian corn, and consists in tracing on the ground parallel furrows and other furrows at right angles with the former, the Indian corn being placed by hand at the intersecting points of these furrows in lots of two or three grains.

The invention consists in the construction and novel combination of parts, fully described hereinafter and specifically pointed out in the claims.

Figure 1:
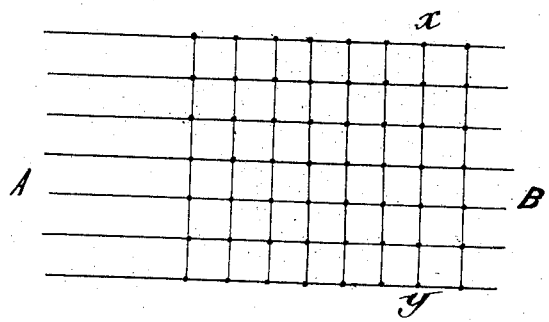
Figure 2:
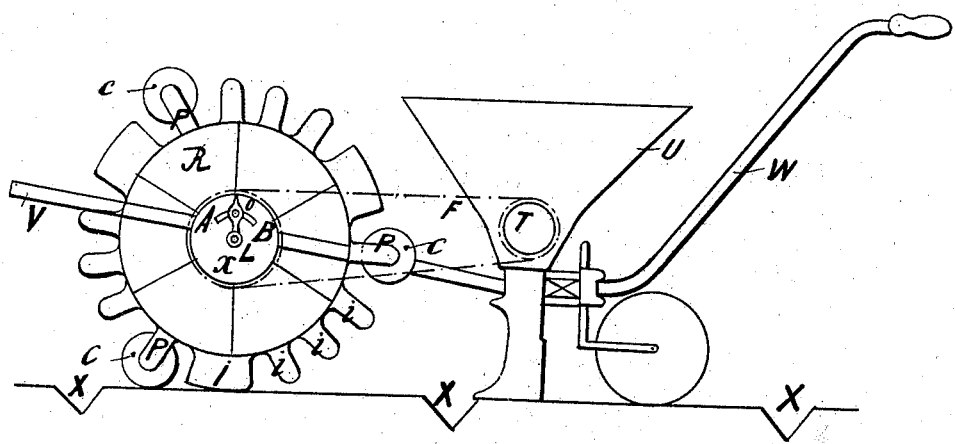

In the accompanying drawings, Figure 1 is a diagram showing the furrows on the ground for the sowing in square. Fig. 2 shows a side elevation of a planter provided with my improved regulating attachment.

R represents a wheel arranged between the shafts V of a planter U.

W indicates the directing arms or handles of the planter. The wheel R carries pairs of radial arms P, arranged at one hundred and twenty degrees the one from the other. Between the arms of each pair I arrange rotatable rollers C. Between each of said pairs of arms the wheel R is provided with fingers $i i'$, similar to the teeth of cog-wheels, the first, $i$, of which, immediately following the roller, is somewhat larger than the others.

The axle of the wheel carries a loosely-mounted sprocket-wheel $x$, having a curved slot A B, the center of which is that of the wheel-axle. A strong needle L, keyed on the wheel-axle, has opposite the slot an eye engaged by a bolt, which may be screwed tight to secure the wheel $x$ to the axle in any desired position between A and B.

F is a chain transmitting the movement from wheel R to the wheels T of the feeder or planter.

X X are furrows traced in the ground to receive the seed.

The axes of the rollers C are situated on the same circumference as the ends of the fingers $i i$.

The machine operates as follows: First very apparent furrows are traced on the ground. The wheel has a suitable diameter, so that the rollers C, fitted around said wheel, concur when said wheel is revolving on the ground with the traced furrows, touching the ground a little behind these furrows. This wheel under the effect of the traction exerted on the shafts V turns on its fingered periphery until the first roller comes into contact with the ground, when it no longer turns on said fingered circumference. It is the roller which carries it off until it meets itself the first furrow, where it enters without being able to get out. The wheel R then turns in passing over the furrow and brings back the second roller at the next furrow in like manner, and so on for all the length of the furrowed ground.

The wheel operates by the chain F the feeders or distributers of the planter, which may be regulated by suitably keying the transmission-wheels, so that the seed be dropped at the exact moment into the hollow of the furrows. This is obtained by the slot A B.

The fingers $i i$, carried by the wheel, secure the adherence of the latter on the ground and prevent all sliding. The projection I, which follows the roller, has a curved periphery and serves as a foot onto which the wheel R slides when the roller does not exactly meet with the furrow in the ground, this case being represented in Fig. 2. In the movement of the wheel the roller must always precede the foot.

The aforegoing regulating attachment may be applied to any kind of planters. It allows of the sowing being performed with the greatest exactness and renders the handicraft of sowing in square needless.

Having fully described my invention, what I claim, and desire to secure by Letters Patent, is—

1. The combination with the planter, of a wheel fitted in front of same, fingers arranged on the rim of said wheel, rollers fitted onto radial arms, and feet placed immediately behind the rollers, substantially as set forth.

2. In a machine of the class described, the combination, with a wheel journaled in front of a planter, of a sprocket-wheel mounted on the axle of said wheel, a circular slot provided in said sprocket-wheel, a needle keyed on the axle of the wheel, a screw-bolt connecting said sprocket-wheel with the axle of the main wheel, a transmission-chain extending around the sprocket-wheel and the wheel operating the seed-distributer of the planter, substantially as set forth.

ETIENNE LATISNIÈRE.

Witnesses:
Z. X. BAYLANG,
C. L. ESPRASSE.